(12) United States Patent
Carr et al.

(10) Patent No.: US 8,956,543 B2
(45) Date of Patent: Feb. 17, 2015

(54) FEEDER WITH SCREEN FOR SHAKER

(75) Inventors: Brian S. Carr, Burlington, KY (US); John Fedders, Florence, KY (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 13/823,002

(22) PCT Filed: Sep. 14, 2011

(86) PCT No.: PCT/US2011/051581
§ 371 (c)(1),
(2), (4) Date: May 16, 2013

(87) PCT Pub. No.: WO2012/037243
PCT Pub. Date: Mar. 22, 2012

(65) Prior Publication Data
US 2013/0220945 A1 Aug. 29, 2013

Related U.S. Application Data

(60) Provisional application No. 61/383,233, filed on Sep. 15, 2010.

(51) Int. Cl.
*B01D 33/03* (2006.01)
*B01D 35/00* (2006.01)
(Continued)

(52) U.S. Cl.
CPC ............. *B01D 36/003* (2013.01); *B07B 1/04* (2013.01); *B07B 1/4609* (2013.01); *B07B 13/16* (2013.01); *E21B 21/01* (2013.01); *E21B 21/065* (2013.01)
USPC ........... 210/790; 210/155; 210/162; 210/260; 210/261; 210/388; 210/433.1; 210/498; 175/66; 175/206

(58) Field of Classification Search
CPC .......... B01D 2221/04; B01D 2221/08; B01D 33/03; B01D 33/0346; B01D 36/003; B01D 35/0276; B01D 35/027; B01D 35/20; B01D 35/28; B01D 29/03; B01D 29/031; B01D 29/01; B01D 29/0095; B01D 29/0018; B01D 29/002; B01D 2201/28; B01D 2201/265; B01D 2201/26; E21B 21/01; E21B 21/063; E21B 21/065; B07B 1/04; B07B 1/4609
USPC ......... 175/66, 206; 201/768, 801, 172.6, 241, 201/259–262, 320, 433.1, 456; 210/768, 210/790, 800, 801, 802, 804, 806, 155, 162, 210/172.6, 241, 259–262, 320, 388, 389, 210/433.1, 434, 456, 498
See application file for complete search history.

(56) References Cited

U.S. PATENT DOCUMENTS

| | | | |
|---|---|---|---|
| 3,640,383 | A | 2/1972 | Wantling |
| 4,384,952 | A | 5/1983 | Parsons et al. |

(Continued)

FOREIGN PATENT DOCUMENTS

| | | |
|---|---|---|
| CA | 2803674 A1 | 12/2011 |
| EA | 013730 B1 | 6/2010 |

(Continued)

OTHER PUBLICATIONS

International Search Report issued in PCT/US2011/051581 mailed on Apr. 12, 2012 (2 pages).

(Continued)

*Primary Examiner* — Lucas Stelling
(74) *Attorney, Agent, or Firm* — Osha Liang LLP

(57) ABSTRACT

Embodiments disclosed herein relate to a fluid distribution apparatus. The fluid distribution apparatus has a housing including an inlet configured to receive a drilling material, a first outlet configured to direct a first portion of the drilling material onto a first separatory surface, and a second outlet configured to direct a second portion of the drilling material onto a second separatory surface. The fluid distribution apparatus further includes a screen disposed within the housing and configured to separate solids from the second portion of the drilling material directed through the second outlet onto the second separatory surface.

18 Claims, 3 Drawing Sheets

(51) Int. Cl.
*B01D 35/20* (2006.01)
*B01D 35/28* (2006.01)
*B01D 29/01* (2006.01)
*B07B 1/04* (2006.01)
*E21B 21/01* (2006.01)
*E21B 21/06* (2006.01)
*B01D 36/00* (2006.01)
*B07B 1/46* (2006.01)
*B07B 13/16* (2006.01)

(56) References Cited

U.S. PATENT DOCUMENTS

| | | | | |
|---|---|---|---|---|
| 4,474,254 A | * | 10/1984 | Etter et al. | 175/206 |
| 4,871,454 A | * | 10/1989 | Lott | 210/241 |
| 4,940,535 A | | 7/1990 | Fisher et al. | |
| 5,462,673 A | * | 10/1995 | Piers | 210/391 |
| 5,593,582 A | | 1/1997 | Roff, Jr. | |
| 5,921,399 A | * | 7/1999 | Bakula et al. | 210/396 |
| 6,223,906 B1 | | 5/2001 | Williams | |
| 6,500,331 B2 | * | 12/2002 | Massignani | 210/155 |
| 6,530,482 B1 | | 3/2003 | Wiseman | |
| 2002/0079251 A1 | * | 6/2002 | Schulte et al. | 210/499 |

FOREIGN PATENT DOCUMENTS

| | | |
|---|---|---|
| EP | 0908599 B1 | 5/2004 |
| SU | 34851 A1 | 2/1934 |
| WO | 2004/110589 A1 | 12/2004 |
| WO | 2009085162 A2 | 7/2009 |

OTHER PUBLICATIONS

Written Opinion of the International Searching Authority issued in PCT/US2011/051581 mailed on Apr. 12, 2012 (3 pages).

Examination Report issued in corresponding Canadian Patent Application No. 2,811,443; Dated Apr. 11, 2014 (3 pages).

Official Decision of Grant issued in corresponding Russian Application No. 2013116903/03 dated Apr. 21, 2014 (14 pages).

Search Report issued in corresponding European Application No. EP11825865; Dated Nov. 3, 2014 (7 pages).

* cited by examiner

FEEDER WITH SCREEN FOR SHAKER

BACKGROUND

1. Field of the Invention

Embodiments of the present disclosure generally relate to apparatuses and systems for distributing and feeding drilling material to a vibratory separator. In addition, embodiments disclosed herein relate to apparatuses and systems to maximize the efficiency of screening surfaces of vibratory separators.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus in use today to remove cuttings and other solid particulates from drilling fluid are commonly referred to in the industry as "shale shakers." A shale shaker, also known as a vibratory separator, is a vibrating sieve-like table upon which returning solids laden drilling fluid is deposited and through which clean drilling fluid emerges. Typically, the shale shaker is an angled table with a generally perforated filter screen bottom. Returning drilling fluid is deposited at the feed end of the shale shaker. As the drilling fluid travels down the length of the vibrating table, the fluid falls through the perforations to a reservoir below leaving the solid particulate material behind. The vibrating action of the shale shaker table conveys solid particles left behind until they fall off the discharge end of the shaker table. The above described apparatus is illustrative of one type of shale shaker known to those of ordinary skill in the art. In alternate shale shakers, the top edge of the shaker may be relatively closer to the ground than the lower end. In such shale shakers, the angle of inclination may require the movement of particulates in a generally upward direction. In still other shale shakers, the table may not be angled, thus the vibrating action of the shaker alone may enable particle/fluid separation. Regardless, table inclination and/or design variations of existing shale shakers should not be considered a limitation of the present disclosure.

Preferably, the amount of vibration and the angle of inclination of the shale shaker table are adjustable to accommodate various drilling fluid flow rates and particulate percentages in the drilling fluid. After the fluid passes through the perforated bottom of the shale shaker, it can either return to service in the borehole immediately, be stored for measurement and evaluation, or pass through an additional piece of equipment (e.g., a drying shaker, centrifuge, or a smaller sized shale shaker) to further remove smaller cuttings.

As drilling fluid is processed, residual drilling waste (e.g., high density fluids and particulate matter), may become stuck or entrained on the shaker screens and other internal shaker components. As the amount of residual drilling waste increases, the efficiency of the shale shaker may decrease due to, for example, clogged screens, clogged outlet lines, and/or "gummed up" internal components. To maintain shaker efficiency, the residual drilling waste must be removed from the shaker components.

Accordingly, there exists a need to increase the efficiency of shakers by reducing the amount of residual drilling waste that may clog up and entrain on the components of the shaker. Additionally, there exists a need to increase the efficiency of shakers by providing drilling material to multiple decks of a shaker, when provided, such that each deck of the shaker may be able to filter drilling fluid simultaneously.

SUMMARY OF THE DISCLOSURE

In one aspect, embodiments disclosed herein relate to a fluid distribution apparatus. The fluid distribution apparatus has a housing including an inlet configured to receive a drilling material, a first outlet configured to direct a first portion of the drilling material onto a first separatory surface, and a second outlet configured to direct a second portion of the drilling material onto a second separatory surface. The fluid distribution apparatus further includes a screen disposed within the housing and configured to separate solids from the second portion of the drilling material directed through the second outlet onto the second separatory surface.

In another aspect, embodiments disclosed herein relate to a method to separate solids from a drilling material. The method includes receiving the drilling material through an inlet of a housing, directing a first portion of the drilling material through a first outlet of the housing and onto a first separatory surface, separating solids from a second portion of the drilling material with a screen disposed within the housing, and directing the second portion of the drilling material through a second outlet of the housing and onto a second separatory surface.

In another aspect, embodiments disclosed herein relate to a fluid distribution system. The system includes a shaker configured to separate solids from a drilling fluid, wherein the shaker comprises a first deck and a second deck, at least one motor coupled to the shaker, wherein the motor is configured to provide vibratory motion to the shaker, and a fluid distribution apparatus coupled to a feed end of the shaker. The fluid distribution apparatus includes a housing configured to receive the drilling fluid and direct the drilling fluid through a first outlet to the first deck and a second outlet to the second deck, and a screen disposed within the housing and configured to separate solids from the drilling fluid directed by the housing through the second outlet.

Other aspects and advantages of the invention will be apparent from the following description and the appended claims.

DETAILED DESCRIPTION

In one aspect, embodiments disclosed herein relate to apparatuses and systems for distributing drilling material to a vibratory separator. In particular, embodiments of the present disclosure provide a fluid distribution apparatus configured to couple to a vibratory separator and to direct and distribute a flow of drilling material onto at least one separatory surface of a vibratory separator. In another aspect, embodiments of the present disclosure relate to apparatuses and systems to maximize the efficiency of screening surfaces of vibratory separators, such as by providing drilling material to multiple decks of a shaker, when provided, such that each deck of the shaker may be able to filter drilling fluid simultaneously.

Figure 1:
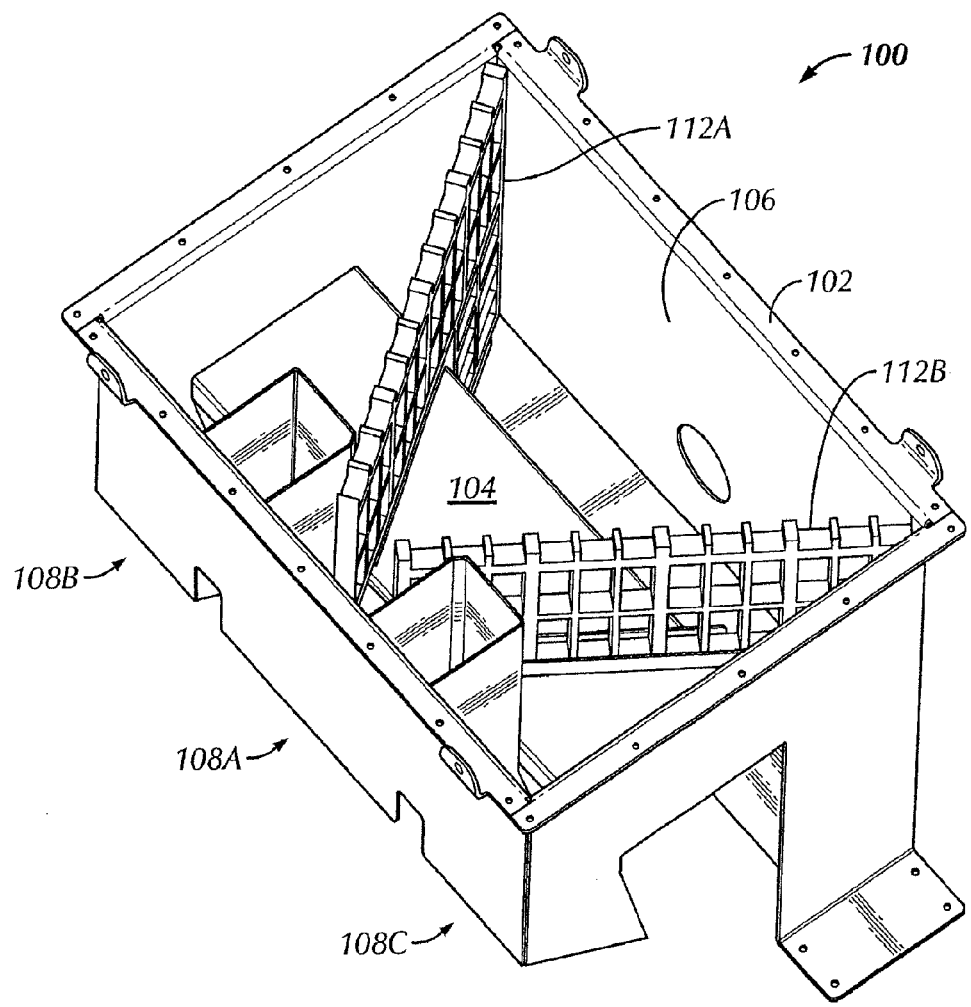
FIG. 1 is a perspective view of a fluid distribution apparatus according to embodiments of the present disclosure.
Figure 2:
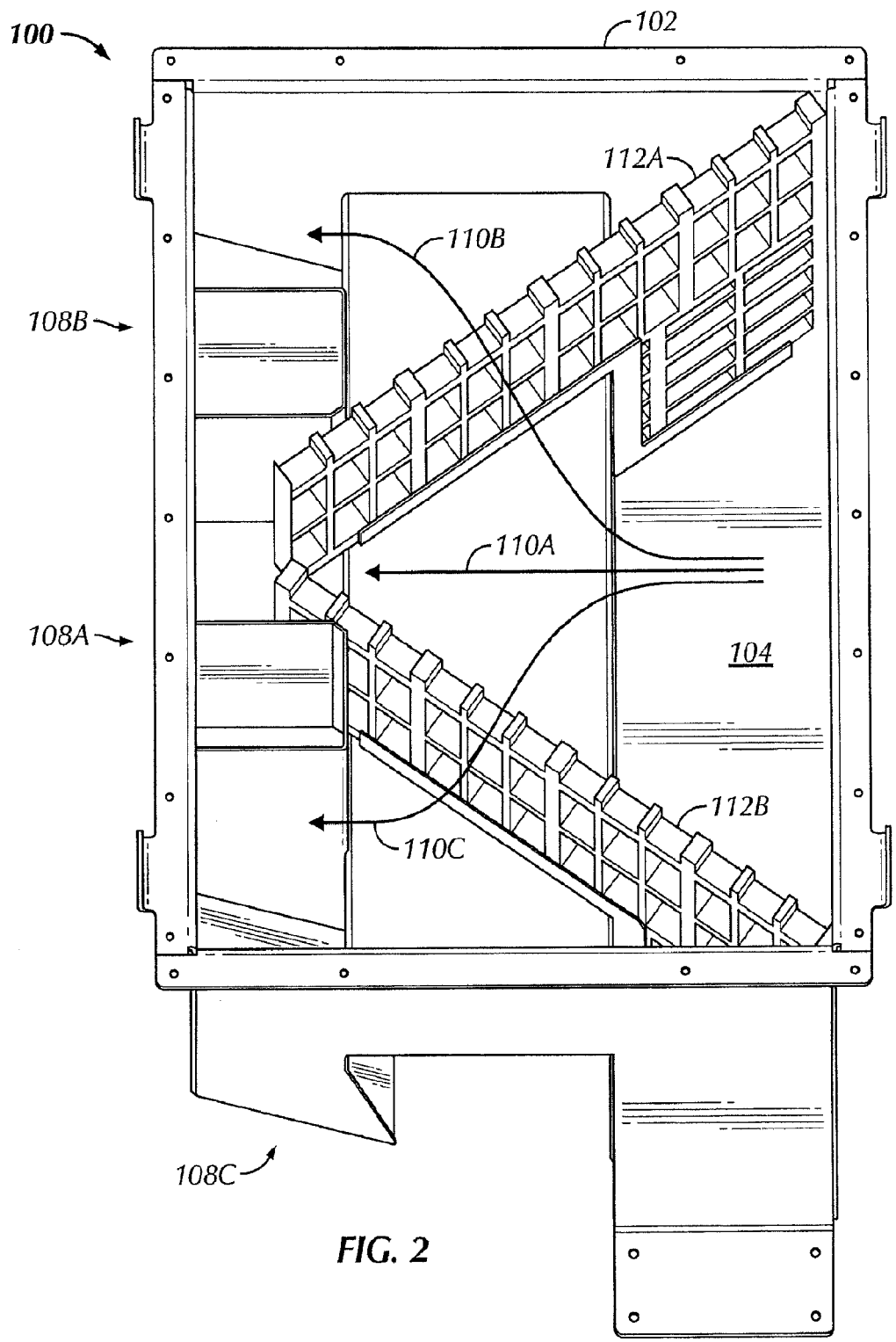
FIG. 2 is a perspective view of a fluid distribution apparatus according to embodiments of the present disclosure.

Referring to FIGS. 1 and 2, a fluid distribution apparatus 100 is shown. The fluid distribution apparatus 100, also known as a feeder, includes a housing 102 configured to couple to a feed end of a vibratory separator or shaker (shown below in FIG. 3), a gumbo separator, or any other separatory system known in the art that may be used to separate and/or filter drilling fluids, drilling materials, muds, etc. The housing 102 includes a bottom surface 104, such as a stepped bottom surface shown in FIGS. 1 and 2, a flat bottom surface, and/or any other bottom surface known in the art.

The housing 102 also includes at least one inlet 106, which may be formed on the side of the housing 102, as shown, or may be formed on the top of the housing 102. As such, one of ordinary skill will appreciate that the inlet can be from the top, the back or the side, or in other locations as desired. The at least one inlet 106 is configured to receive a flow of drilling material (e.g., drilling fluid, gumbo). Thus, regardless of the positioning of the inlet 106, the housing 102 is configured to receive a flow of drilling material.

The housing 102 also includes at least one outlet 108, which may be formed on the side of the housing 102, as shown, or may be formed on the bottom of the housing 102. As such, one of ordinary skill will appreciate that the outlet can be from the top, the back or the side, or in other locations as desired. As shown in FIGS. 1 and 2, the housing 102 includes at least three outlets 108A, 108B, and 108C. The outlets 108A, 108B, and 108C are configured to direct the flow of drilling material received by the housing 102 onto one or more separatory surfaces (e.g., a shaker deck, a screening assembly, etc.) of one or more separatory systems. For example, in one embodiment, the outlet 108A may be used to direct the flow of drilling material received by the housing 102 onto one separatory surface of a separatory system, and the outlets 108B and 108C may be used to direct the flow of drilling material received by the housing 102 onto other separatory surfaces of the separatory system.

Though the fluid distribution apparatus 100 in FIGS. 1 and 2 includes three outlets 108A, 108B, and 108C, the fluid distribution apparatus 100 may include only one or more than three outlets, depending on the configuration of the separatory system used with the fluid distribution apparatus 100. Accordingly, the number of outlets used with the fluid distribution apparatus should not be considered a limitation of the present disclosure.

Continuing with FIGS. 1 and 2, the fluid distribution apparatus 100 may define one or more flow paths therethrough for directing drilling material. For example, as the housing 102 of the fluid distribution apparatus 100 may include multiple outlets 108A, 108B, and 108C, the housing 102 may be configured to define a flow path between the inlet 106 and one or more of the outlets 108A, 108B, and 108C.

As such, and as shown particularly in FIG. 2, the housing 102 may define three flow paths 110A, 110B, and 110C between the inlet 106 and the three outlets 108A, 108B, and 108C. The housing 102 may define the flow path 110A between the inlet 106 and the outlet 108A, thereby directing drilling material within the housing 102 to the outlet 108A. The housing 102 may also define the flow path 110B between the inlet 106 and the outlet 108B, thereby directing drilling material within the housing 102 to the outlet 108B. Further, the housing 102 may also define the flow path 110C between the inlet 106 and the outlet 108C, thereby directing drilling material within the housing 102 to the outlet 108C.

Similar to the outlets described above, though the fluid distribution apparatus 100 in FIG. 2 includes three flow paths 110A, 110B, and 110C, the fluid distribution apparatus 100 may include only one or more than three flow paths, depending on the configuration of the separatory system used with the fluid distribution apparatus 100. Accordingly, the number of flow paths used with the fluid distribution apparatus should not be considered a limitation of the present disclosure.

As shown, the fluid distribution apparatus 100 further includes one or more screens 112. Particularly, in this embodiment, the fluid distribution apparatus 100 includes two screens 112A and 112B. The screens 112 are disposed within the housing 102 of the fluid distribution apparatus 100, such as by coupling and/or attaching the screens 112A and 112B to the housing 102. The screens 112 are configured to separate solids from drilling material received by the fluid distribution apparatus 100 before being directed through one or more of the outlets 108. For example, as shown in FIG. 2, the screen 112A may be disposed within the housing 102 to be within the flow path 110B, thereby enabling the screen 112A to filter and separate solids from drilling material directed along the flow path 110B through the screen 112A and to the outlet 108B. Similarly, the screen 112B may be disposed within the housing 102 to be within the flow path 110C, thereby enabling the screen 112B to filter and separate solids from drilling material directed along the flow path 110C through the screen 112B and to the outlet 108C. Also, as noted, a screen may not be disposed within the flow path 110A. As such, drilling material directed along the flow path 110A may not be filtered, at least in this embodiment, before exiting the outlet 108A.

Similar to the outlets and the flow paths described above, though the fluid distribution apparatus 100 in FIG. 2 includes two screens 112A and 112B, the fluid distribution apparatus 100 needs to include only one or more screens, depending on the configuration of the separatory system used with the fluid distribution apparatus 100. Accordingly, the number of screens used with the fluid distribution apparatus should not be considered a limitation of the present disclosure.

Further, the screens 112 may be made from any material known in the art, including, but not limited to, steel, composite, mesh, and/or cloth. For example, the screens 112 may be formed from urethane, such as to have slots formed therein to filter and separate solids from drilling material. The screens 112 may also be formed from and/or include mesh, thereby reducing the size of slots or perforations formed within the screens. In one embodiment, the mesh for the screens 112 may include a size of about 2.5 mm (0.1 in). This size for mesh may increase the filtering performed by the screens 112 and decrease the amount of solids and/or particulate in drilling fluid directed to the outlets 108B and 108C.

Moreover, the screens 112 may be coupled and connected to the housing 102 by any connection type known in the art, including, but not limited to, pretension assemblies and/or other mechanical assemblies. For example, in one embodiment, the housing 102 may have one or more tracks or slots formed therein, such as tracks formed within the sides and bottom of the inside of the housing 102, depending on the number of screens 112 desired to be used with the fluid distribution apparatus 100. The screens 112 may then be received and/or disposed within the tracks of the housing 102, thereby securing the screens 112 within the housing 102. Further, when coupling the screens 112 to the housing 102, one or more seals may be formed between the screens 112 and the housing 102. The seals may be used to prevent the flow of drilling material past and around the screens 112. As such, a seal formed between the screen 112A and the housing 102 may prevent drilling material from leaking past the screen 112A without passing through and being filtered by the screen 112A. Similarly, a seal formed between the screen 112B and the housing 102 may prevent drilling material from leaking past the screen 112B without passing through and being filtered by the screen 112B.

Referring still to FIGS. 1 and 2, one or more of the screens 112 may be disposed at an angle within the fluid distribution apparatus 100. For example, as shown, the screen 112A may be disposed at an angle with respect to the inlet 106 and the flow path 110B formed by the housing 102, and the screen 112B may be disposed at an angle with respect to the inlet 106 and the flow path 110C formed by the housing 102. In one embodiment, one or more of the screens 112 may be disposed at an angle between about 30 degrees and about 60 degrees with respect to the inlet 106 and one or more of the flow paths 110B and 110C. In another embodiment, one or more of the screens 112 may be disposed at an angle of about 45 degrees with respect to the inlet 106 and one or more of the flow paths 110B and 110C. However, those having ordinary skill in the art will appreciate that the present disclosure is not so limited, as one or more screens of the fluid distribution apparatus may be disposed at other angles, greater or smaller than those described above, and/or may be disposed at no angle with respect to the inlet and/or flow paths.

Figure 3:
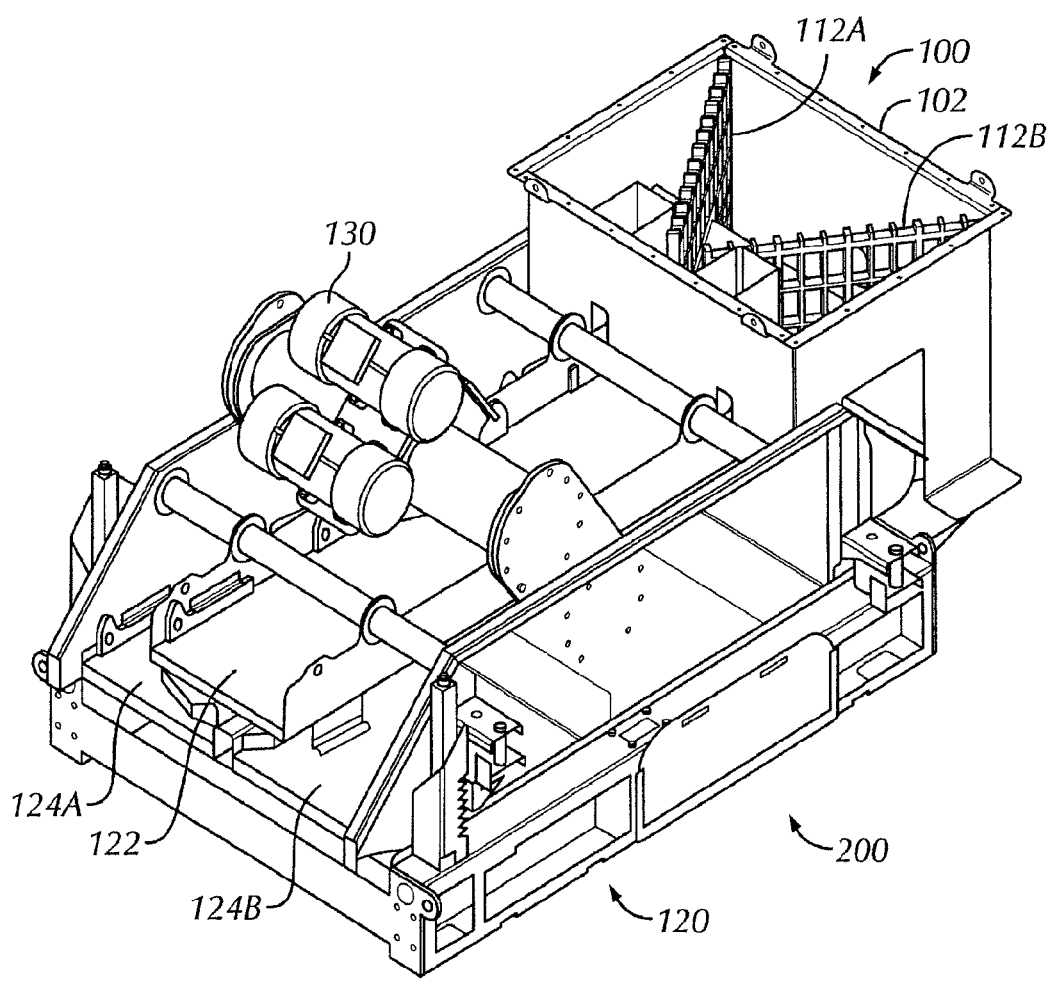
FIG. 3 is a perspective view of a fluid distribution system according to embodiments of the present disclosure.

Referring now to FIG. 3, a shaker 200 is shown. In this embodiment, the shaker 200 includes the fluid distribution apparatus 100 (shown in FIGS. 1 and 2) coupled to a vibratory separator 120. The vibratory separator 120 may include one or more screening decks 122 and 124 (i.e., one or more separatory surfaces). For example, as shown in FIG. 3, the vibratory separator 120 includes a first deck 122, such as a scalping deck, and also includes one or more other decks 124A and 124B, such as a first primary deck and a second primary deck. Further, at least one motor 130 is coupled and/or attached to the vibratory separator 120 to provide vibratory motion while separating solids from drilling material with the vibratory separator 120.

A mesh screen (not shown) may be provided on each of the screening decks 122 and 124 of the vibratory separator 120 to filter out solids of various sizes from drilling material according to the size of the respective mesh. For example, in the shaker 200, the screening deck 122 may have a larger mesh size than that of the screening decks 124, thereby enabling the screening decks 124 to filter out solids having smaller sizes as compared to the screening deck 122. In some embodiments, the mesh screen may be part of screen assemblies disposed on the screening decks 122 and 124. Those of ordinary skill in the art will appreciate that the present disclosure is not limited to any particular screen assembly or mesh screen arrangement.

Further, in one embodiment, when filtering and separating solids from drilling material, drilling material provided to the screening deck 122 may not only be filtered by screening deck 122, but drilling material provided to the screening deck 122 may also travel through the vibratory separator 120 and the shaker 200 to one of the screening decks 124A and 124B. For example, drilling material may be filtered and have solids separated therefrom by the screening deck 122, and then may pass and travel to the screening deck 124A to have the drilling material filtered and have solids separated therefrom by the screening deck 124A.

As shown in FIG. 3, though the vibratory separator 120 and the shaker 200 include three screening decks 122, 124A, and 124B, the shaker 200 is not so limited. For example, the shaker 200 may include more or less than three screening decks 122, 124A, and 124B, in which the arrangement and configuration of the screening decks may vary accordingly. As such, the number, arrangement, and configuration of screening decks used with the shaker should not be considered a limitation of the present disclosure.

Referring now to FIGS. 1-3 collectively, when using the shaker 200 with the fluid distribution apparatus 100 coupled to a vibratory separator 120, the fluid distribution apparatus 100 may be used to filter and separate solids from at least a portion of the drilling material directed through the fluid distribution apparatus 100 and onto the screening decks 122, 124A, and 124B. For example, as described above, the fluid distribution apparatus 100 may include three outlets 108A, 108B, and 108C. The outlet 108A may be configured to direct drilling material onto the screening deck 122, the outlet 108B may be configured to direct drilling material onto the screening deck 124A, and the outlet 108C may be configured to direct drilling material onto the screening deck 124B. As such, when exiting one of the outlets 108B and 108C, the drilling material may have to pass through one of the screens 112A and 112B, respectively.

As discussed above, the fluid distribution apparatus 100 may have one or more flow paths 110A, 110B, and 110C formed therethrough, in which the flow paths 110B and 110C direct the drilling material to flow through the screens 112A and 112B. When flowing through flow paths 110B and 110C, the screens 112A and 112B may be used to filter and separate solids from the portions of the drilling material directed through the outlets 108B and 108C, respectively. Thus, drilling material exiting from the outlets 108B and 108C and onto the screening decks 124A and 124B may already be filtered and have solids separated therefrom, as least partially, by the screens 112A and 112B disposed within the fluid distribution apparatus 100. As such, the screening decks 124A and 124B may be used to again filter and separate solids from the drilling material directed onto the screening decks 124A and 124B. After passing through the screening decks 124A and 124B, the drilling material may then exit the vibratory separator 120 and the shaker 200.

Drilling material exiting the outlet 108A of the fluid distribution apparatus 100 may not have already passed through a screen, as a screen may not be provided within the flow path 110A when directed out of the outlet 108A and onto the screening deck 122. Further, solids and particulate separated by the screens 112A and 112B in the fluid distribution apparatus 100 may be pushed forward along the flow path 110A and exit the outlet 108A. As such, the screening deck 122 may be used to filter and separate solids from the drilling material directed onto the screening deck 122, in which the screening deck 122 may then direct the drilling material onto one of the screening decks 124A and 124B. The screening decks 124A and 124B may be used to again filter and separate solids from the drilling material exiting the outlet 108A.

In an embodiment in which the shaker includes a fluid distribution apparatus coupled with a vibratory separator having multiple screening decks, the shaker advantageously is capable of processing and filtering drilling material received by the fluid distribution apparatus in series and/or in parallel. For example, the shaker may be capable of processing and filtering drilling material received by the fluid distribution apparatus in series by having the drilling material filtered by at least two screens, such as filtering by the screens in the fluid distribution apparatus, the first screening deck of the vibratory separator, and/or the second screening deck of the vibratory separator. Further, the shaker may be capable of processing and filtering drilling material received by the fluid distribution apparatus in parallel, such as by having the drilling material directed to the first screening deck and the second screening deck simultaneously, thereby increasing the efficiency of the shaker.

Increasing the efficiency of a shaker, such as by having parallel and series processing and filtering of drilling material, maximizes the use of the separatory surfaces on all deck levels of a multi-deck vibratory separator. One of ordinary skill in the art will appreciate that other vibratory separators may be combined with a fluid distribution apparatus in accordance with embodiments disclosed herein, including vibratory separators having one screening deck, two screening decks, three screening decks, or more. Further, a fluid distribution apparatus in accordance with embodiments disclosed herein may be coupled with other separatory systems, including, for example, gumbo separators, to maximize the efficiency of the screening surface.

As mentioned above, the vibratory separator and the shaker are not limited to an arrangement of only three screening decks. As such, the vibratory separator and shaker may include more than three screening decks and/or less than three screening decks. Further, the arrangement of the screening decks, as shown in FIG. 3, may also vary. For example, rather than having the first screening deck arranged above the second two screening decks, with the second two screening decks at the same height, each of the screening decks may be arranged, or stacked, one above the other. For example, in one embodiment, the vibratory separator may include multiple deck separators, such as the MD-3 Shale Shaker, commercially available from M-I Swaco, L.L.C., in Houston, Tex. Accordingly, the number, arrangement, and configuration of screening decks used with the shaker should not be considered a limitation of the present disclosure Advantageously, embodiments disclosed herein may provide more efficient fluid distribution apparatus, more efficient shakers, and/or more efficient screening systems. In particular, embodiments disclosed herein provide an apparatus for filtering and separating solids from drilling material and directing the drilling material onto one or more separatory surfaces. As such, embodiments of the present disclosure may provide more efficient use of the screening decks of a vibratory separator, such as by enabling the vibratory separator to receive drilling material feeds in series and/or parallel.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A fluid distribution apparatus comprising:
    a housing comprising:
    a first outer wall;
    a second outer wall;
    an inlet formed in the first outer wall of the housing;
    a first outlet formed in the second outer wall,
    a second outlet formed in the second outer wall; and
    a screen having a plurality of perforations therethrough, the screen substantially vertically within the housing, and extending from a first corner of the housing at an angle between 30 and 60 degrees with respect to the first outer wall such that at least a portion of the screen is disposed between the inlet and the second outlet.

2. The fluid distribution apparatus of claim 1, wherein the housing further comprises:
    a third outlet formed in the second outer wall; and
    a second screen disposed substantially vertically within the housing such that at least a portion of the screen is disposed between the inlet and the third outlet.

3. The fluid distribution apparatus of claim 1, wherein the screen is disposed at an angle of about 45 degrees with respect to the first outer wall.

4. The fluid distribution apparatus of claim 1, wherein the screen is coupled to the housing.

5. The fluid distribution apparatus of claim 1, wherein the housing comprises a track disposed on a bottom surface of the housing and is configured to receive the screen within the track.

6. The fluid distribution apparatus of claim 1, wherein the screen comprises at least one selected from a group consisting of a metal, a composite, a mesh, and a cloth.

7. The fluid distribution apparatus of claim 1, wherein the fluid distribution apparatus is configured to couple to a vibratory separator.

8. The fluid distribution apparatus of claim 1, wherein the housing further comprises a stepped bottom surface.

9. The fluid distribution apparatus of claim 1, wherein at least a portion of the screen extends from a bottom surface of a housing to a height approximately equal to a height of the housing.

10. The fluid distribution apparatus of claim 1, wherein the second outer wall is a bottom surface of the housing.

11. A method comprising:
    receiving a drilling material through an inlet in a first wall of a housing;
    directing a first portion of the drilling material through a first outlet in a second wall of the housing and onto a first separatory surface;
    separating solids from a second portion of the drilling material by passing the drilling material through a substantially vertical screen disposed within the housing, thereby separating the second portion of the drilling material into solids and a filtered second portion;

directing the filtered second portion from the substantially vertical screen to a second outlet formed in the second wall, through the second outlet, and onto a second separatory surface.

12. The method of claim 11, further comprising:

separating solids from a third portion of the drilling material by passing the drilling material through a second substantially vertical screen disposed within the housing, thereby separating the third portion of the drilling material into the solids and a filtered third portion of the drilling material; and directing the filtered third portion from the second substantially vertical screen to a third outlet formed in the second wall, through the third outlet, and onto at least one of the second separatory surface or a third separatory surface.

13. The method of claim 12, wherein the filtered third portion is directed to the third separatory surface, further comprising separating solids from the filtered second portion with the second separatory surface in parallel with separating solids from the filtered third portion with the third separatory surface.

14. The method of claim 11, further comprising:

coupling the housing to a feed end of a shaker.

15. A fluid distribution system comprising:

a shaker configured to separate solids from a drilling fluid, wherein the shaker comprises a first deck and a second deck;

at least one motor coupled to the shaker, wherein the motor is configured to provide vibratory motion to the shaker; and a fluid distribution apparatus coupled to a feed end of the shaker, wherein the fluid distribution apparatus comprises:

a housing having:

an inlet formed in a first outer wall:

a first outlet formed in a second outer wall to direct the drilling fluid to the first deck;

a second outlet formed in the second outer wall to direct the drilling fluid to the second deck; and a screen disposed substantially vertically between the first outer wall and the second outer wall such that at least a portion of the screen is disposed between the inlet and the second outlet.

16. The fluid distribution system of claim 15, wherein the shaker comprises a third deck, wherein the fluid distribution apparatus further comprises:

a third outlet formed in the second outer wall to direct drilling fluid to the third deck;

a second screen disposed substantially vertically between the first outer wall and the second outer wall such that at least a portion of the screen is disposed between the inlet and the third outlet.

17. The fluid distribution system of claim 16, wherein the first deck of the shaker comprises a scalping deck, wherein the second deck of the shaker comprises a first primary deck, and wherein the third deck of the shaker comprises a second primary deck.

18. The fluid distribution system of claim 15, wherein the drilling material comprises a gumbo, and wherein the fluid distribution apparatus is configured to couple to a gumbo separator.

* * * * *